(12) United States Patent
Krogedal et al.

(10) Patent No.: US 7,429,298 B2
(45) Date of Patent: Sep. 30, 2008

(54) PAINTING SYSTEM

(75) Inventors: Arnulf Krogedal, Sandnes (NO); Gisle Bryne, Bryne (NO)

(73) Assignee: ABB AS, Billingstad (NO)

( * ) Notice: Subject to any disclaimer, the term of this patent is extended or adjusted under 35 U.S.C. 154(b) by 0 days.

(21) Appl. No.: 10/893,222

(22) Filed: Jul. 19, 2004

(65) Prior Publication Data

US 2005/0051085 A1 Mar. 10, 2005

Related U.S. Application Data

(60) Provisional application No. 60/487,940, filed on Jul. 18, 2003.

(51) Int. Cl.
*B05B 3/00* (2006.01)
*B05B 15/12* (2006.01)
*B05B 7/06* (2006.01)

(52) U.S. Cl. ............... 118/323; 118/326; 118/321; 118/313; 901/43

(58) Field of Classification Search ............ 118/323, 118/309, 326, 313–316, 321, DIG. 7; 901/15, 901/27, 29, 41, 43; 700/245; 74/490.04; 427/427.2, 427.3
See application file for complete search history.

(56) References Cited

U.S. PATENT DOCUMENTS

| | | | |
|---|---|---|---|
| 4,614,300 A | | 9/1986 | Falcoff |
| 4,630,567 A | * | 12/1986 | Bambousek et al. ........ 118/323 |
| 4,668,146 A | | 5/1987 | Ageta |
| 4,714,044 A | | 12/1987 | Kikuchi et al. |
| 4,784,010 A | * | 11/1988 | Wood et al. ............... 74/490.04 |
| 4,812,104 A | * | 3/1989 | Suzuki ....................... 414/735 |
| 4,919,967 A | | 4/1990 | Handke et al. |
| 5,103,761 A | * | 4/1992 | Ishibashi et al. ............ 118/323 |
| 5,127,363 A | * | 7/1992 | Nakamura et al. .......... 118/695 |
| 5,213,620 A | * | 5/1993 | Meyer ....................... 118/323 |
| 5,240,745 A | | 8/1993 | Yamamoto et al. |
| 5,733,374 A | * | 3/1998 | Ekenberg .................... 118/323 |
| 5,876,803 A | | 3/1999 | Hissen et al. |
| 5,949,209 A | * | 9/1999 | Okamoto et al. ............ 318/563 |
| 5,949,683 A | | 9/1999 | Akami et al. |
| 5,989,643 A | | 11/1999 | Nakagawa et al. |
| 6,208,104 B1 | | 3/2001 | Onoue et al. |
| 6,325,302 B1 | * | 12/2001 | Guzowski et al. ........... 239/132 |
| 6,472,838 B1 | | 10/2002 | Shikazono et al. |
| 2003/0045967 A1 | * | 3/2003 | Milojevic et al. ........... 700/245 |

FOREIGN PATENT DOCUMENTS

EP 0710157 B1 10/1998
JP 59134681 8/1984

(Continued)

OTHER PUBLICATIONS

English Translated Abstract JP-01194959.*

*Primary Examiner*—Yewebdar T Tadesse
(74) *Attorney, Agent, or Firm*—Paul Katterle (57) ABSTRACT

Painting system for painting large objects comprising a paint booth with surrounding walls and a robot installation comprising a plurality of painting robots, each painting robot comprising a stationary base, a stand carried by the base rotatably arranged around a first axis, a first arm carried by the stand rotatably arranged around a second axis, a second arm carried by the first arm rotatably arranged around a third axis and a forth, a fifth and a sixth arm part carried by the second arm for orienting an attached painting tool.

19 Claims, 4 Drawing Sheets

FOREIGN PATENT DOCUMENTS

| | | |
|---|---|---|
| JP | 62294459 | 12/1987 |
| JP | 1194959 | 8/1989 |
| JP | 2251276 | 10/1990 |
| JP | 4022475 | 1/1992 |
| JP | 6312385 | 11/1994 |
| JP | 8164349 | 6/1996 |
| JP | 8229493 | 9/1996 |
| JP | 10080109 | 3/1998 |
| JP | 10138190 | 5/1998 |
| JP | 10192750 | 7/1998 |
| JP | 10202577 | 8/1998 |
| JP | 11057553 | 3/1999 |
| JP | 2000141253 | 5/2000 |
| JP | 2000167451 | 6/2000 |
| JP | 2003144990 | 5/2003 |
| WO | WO 03035275 A1 | 5/2003 |

\* cited by examiner

PAINTING SYSTEM

CROSS-REFERENCE TO RELATED APPLICATIONS

This application claims priority to U.S. provisional patent application 60/487,940 filed Jul. 18, 2003.

TECHNICAL FIELD

This present invention concerns a painting system comprising a paint booth and a robot installation for painting large objects inside the painting booth. More precisely the invention concerns such a painting system including a paint booth with walls isolating the object to be painted from the surroundings. Especially the invention concerns such a system wherein the robot installation contains at least two industrial robots, each comprising at least four axes for servo-controlled movements. An industrial robot in this context comprises a manipulator with electric motors and a control means containing power means for driving the motors and computer means which by instructions from a computer program is arranged for sensing and controlling the manipulator movements

BACKGROUND OF THE INVENTION

Figure 1:
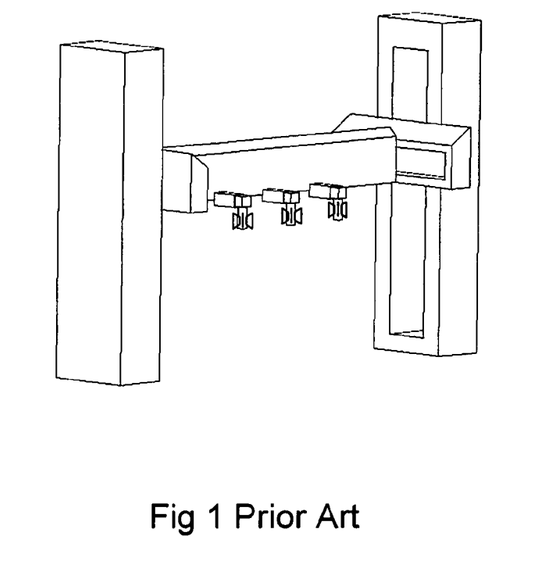
FIG. 1 is a prior art painting manipulator with two stationary stands carrying a flexible horizontal beam with spray guns.
Figure 2:
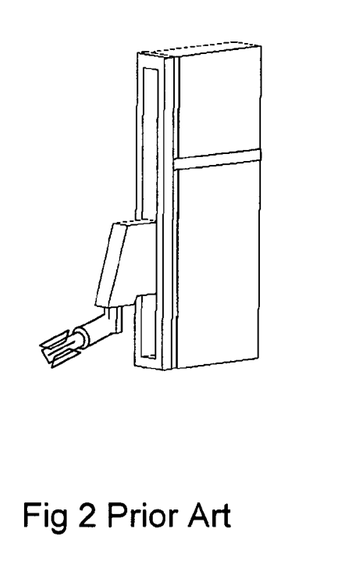
FIG. 2 is a prior art single sided painting manipulator with a moveable arm carrying a spray gun.

Painting of car bodies on an industrial scale usually takes place in a painting booth, through which the car bodies are moved on a conveyor in a line succession. For example painting of car bodies in such booths, simple type of hard automation solutions as reciprocators or the like are used. Apparatus of this type may have a sufficient range of reciprocal motion in the vertical direction, but have rather limited ranges of motion in the transverse direction of the painting booth, and practically no option for tracking the object to be painted in the direction of the conveyor motion through the booth. Several such reciprocators having overlapping working ranges along the length of direction of the booth must then be used to maintain a reasonable conveyor speed and paint coverage. A typical representation of prior art machines of this type are shown in FIGS. 1 and 2.

Figure 3:
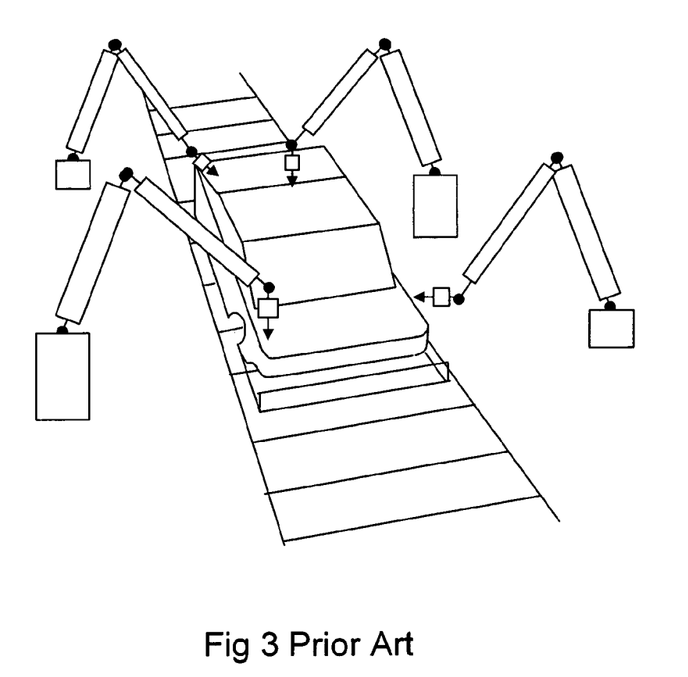
FIG. 3 is a prior art painting manipulator arrangement with four stationary upright mounted industrial robots with spray guns.

In order to obtain an optimal and uniform layer of paint and an optimum painting quality, the paint must be sprayed from the painting tool in a controlled manner normal to the surface to be covered. The motion pattern of the painting tool must then be correspondingly programmed in relation to the curved surfaces and edges of the car body. This can only be accomplished by means of flexible solution including a plurality of industrial robots. The robot can easily adapt the paint tool to the optimal path pattern for the different car models, which are produced/painted in the same production line. Such robot solution must then be located in the paint booth itself, which requires considerably wider booths than would be needed in an optimal production line. A typical view of a prior art paint booth with a plurality of industrial robots for painting a large object is shown in FIG. 3. Another painting apparatus of this kind is known from U.S. Pat. No. 4,714,044.

From U.S. Pat. No. 4,630,567 a spray paint system including a paint booth is previously known. The system comprises two painting robots that are moveable on rails along the a car body in the direction of the conveyor movement of a car stream. The known system discloses a booth with wall defining the enclosed painting area and at least one painting robot located inside this painting area. The painting robot is moveably supported on a track means outside of the painting area. Track means comprising rails however are costly and very delicate in function on dirt and particles on the rails. Thus it is difficult to keep track of the robot position on the rails.

Still all of the known painting system use a plurality of manipulators on each side of the car body to fully cover the whole area to be painted. The more manipulators inside the painting booth necessary for painting the object the higher the investment costs. A larger number of manipulators to be controlled to simultaneously paint the object normally results in a very complex software programming.

A commonly known upright mounted industrial robot has a stand rotatably arranged around a vertical axis. The stand carries a lower arm rotatably arranged around a horizontal axis and the lower arm carries an upper arm also rotatably arranged around a horizontal axis. To reach full operation capacity the robot needs for the maneuvering of the lower arm a clearance between the robot and the back wall. On the other hand the paint booth itself must be as small as possible. Thus there is a collision of demands. The robot needs more space and the booth must be restricted in volume. One way to handle this situation is to arrange a plurality of robots arranged with overlapping operation areas and so operating that the lower arm never swings backwards. Thus in such systems there is no need for a maneuvering space behind the robot. This arrangement of course affects the performance of the robot. The robot then is only capable of making short paint strokes. An increased number of short paint strokes calls for an increased number of time consuming re-orientation operations and severe waste of paint.

Consequently there is a long time need within the industry of car manufacture to decrease the space demands for a paint booth and still increase the operation capacity of the painting robots to maintain or even increase the production volume.

SUMMARY OF THE INVENTION

A primary object of the present invention is to provide a paint system for large objects, which involves a lesser number of stationary painting robots, involving a smaller paint booth and which offers a higher production capacity per robot installed. A paint booth in this context is a sealed of environment comprising a floor, a ceiling and walls which have openings for receiving a car body traveling on a conveyor. The painting robot directed to in this invention is a stationary mounted industrial robot with a painting tool such as a spray painting means (painting gun) attached to its end effector. A secondary object of the invention is to provide a painting system that offers higher operation efficiency and less paint waste.

This object is achieved according to the system and method of the present invention.

According to a first aspect of the invention the objects are achieved by a painting system comprising two painting robots, each mounted on a wall and with the first axis horizontally arranged. By this arrangement the robot is capable of reaching all points covering at least half an object to be painted without any need for a maneuvering space behind the robot. Thus a painting robot according to the invention comprises a stationary base mounted on a wall carrying a stand rotatably arranged around a first axis, the stand carrying a first arm rotatably arranged around a second axis, the first arm carrying a second arm rotatably arranged around a third axis and the second arm carrying a fourth, a fifth and a sixth arm part for orienting the attached spray gun. According to the invention the first axis is oriented in a horizontal plane. The second and the third axes are preferably parallel and oriented normal to the first axis. In a preferred embodiment the first axis is oriented along the direction of the conveyor moving the objects to be painted.

In a further embodiment of the invention the painting robot comprises a hollow structure. The structure contains a plurality of hollow cavities for enclosing the electric motors and power- and signal cables that are used for driving the robot and control of process equipments. Each such cavity contains a protective gas of type inert gas, nitrogen, clean air or any other non-flammable gas or a mixture of such gases under overpressure in order to keep environmental hazardous gases from entering the cavity and being ignited by the sparks from the motors.

Normally each of the two painting robots in the booth are arranged for painting half of an object. This implies that the two arms of each robot must together reach all positions of each halves of the object. Thus the minimum length of the first and the second arm together must be longer than half the length of the object. Since the first and second arm must be able to fold upon each other they are in a preferred embodiment equal in length. Thus with this configuration the length of each arm must be equal or longer than a fourth of the length of the object to be painted. In a further development of this embodiment the second arm comprises a bended structure for better reach performance.

Since the two painting robots are arranged to cover each halves of the object there is no need for a third painting robot. However in situations where the production capacity must be increased or if the object to be painted is very big a third painting robot must be installed. Such a third robot may be fixed in a wall position higher than the first and second painting robot. In a further embodiment of the invention the robot arrangement comprises a control means that makes able the painting robots following an object to be painted continuously moving through the booth.

According to a second aspect of the invention the objects are achieved by a method of painting an object in long continuous strokes. A paint stroke begins with the spray painting gun being oriented in position prior to a path to be painted. The movement begins and at a position just before the start point of the path the gun is turned on. The robot then moves the spray gun along the path at predetermined distance and at a direction normal to the surface of the path. When reaching the end of the path the gun is kept in operation until it has fully passed the path end before the gun is turned off. Then the movement stops and the stroke is completed. Along such a stroke the spray operation of the gun may arbitrarily be turned on or off accounting for openings in a car body such as for instance an opening for receiving a window. In a preferred embodiment the length of such a stroke is equal or longer than the object to be painted. By this longer painting strokes the number of time consuming re-orientation of the gun is reduced. This will result in a more efficient time management of the spraying operation. By using longer strokes the object will be fully painted with fewer strokes. Since there is a moment in the beginning and at the end of each stroke where paint is wasted the total paint waste of a painting operation is reduced.

In a preferred embodiment of the invention the painting system comprises control means containing computer means and computer program means for controlling the painting robots and the painting process. In a further development of this embodiment the computer program is supplied at least in part over a network such as the Internet. In a further development the computer program is kept on a computer readable medium such as a CD rom.

BRIEF DESCRIPTION OF THE DRAWINGS

Other features and advantages of the present invention will become more apparent to a person skilled in the art from the following detailed description in conjunction with the appended drawings in which.

DETAILED DESCRIPTION OF THE INVENTION

Figure 4:
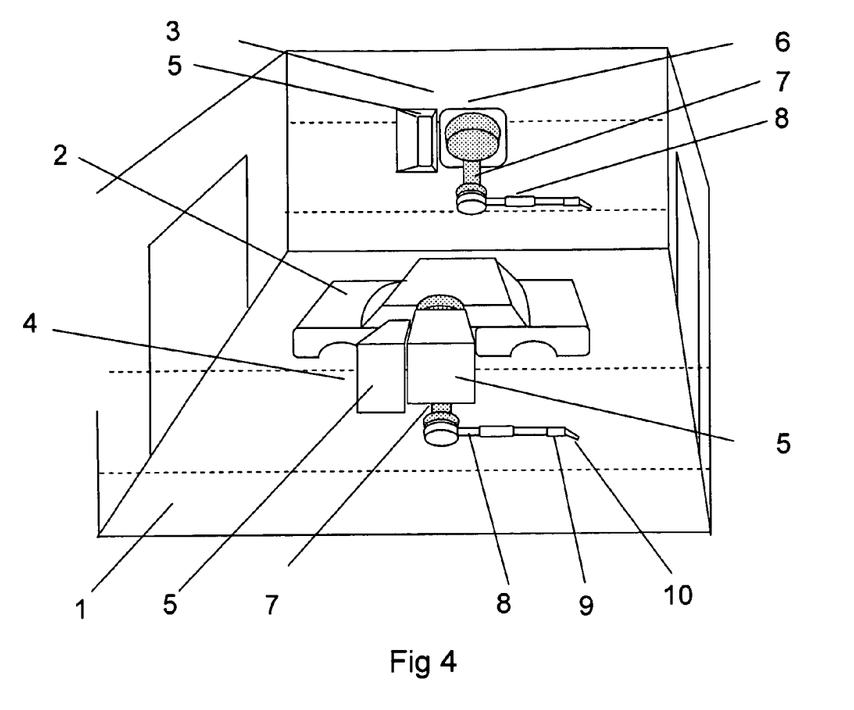
FIG. 4 is a three dimensional view of a painting system according to the invention with two stationary wall mounted industrial robots with spray guns in a paint booth.

According to FIG. 4 a painting system according to the invention comprises a painting booth 1, in which is placed an object, a car body, 2 to be painted. The booth also comprises a first painting robot 3 and a second painting robot 3. Each of the painting robots comprises a base 5 attached to the wall of the booth. The base comprises a cantilever construction and carries a stand 6 rotatably arranged around a first axis, which in the embodiment shown is oriented in the direction of the length of the booth. The stand carries a first arm 7 rotatably arranged around a second axis, which in the embodiment shown is oriented normal to the first axis. The first arm carries a second arm 8 rotatably arranged around a third axis, which in the embodiment shown is oriented parallel to the second axis. The second arm carries an end effector comprising an arm part arrangement 9 with three degrees of freedom moveability. Finally the end effector arrangement caries a painting tool 10 in the form of one or several spray gun(s)/applicator(s).

Figure 5:
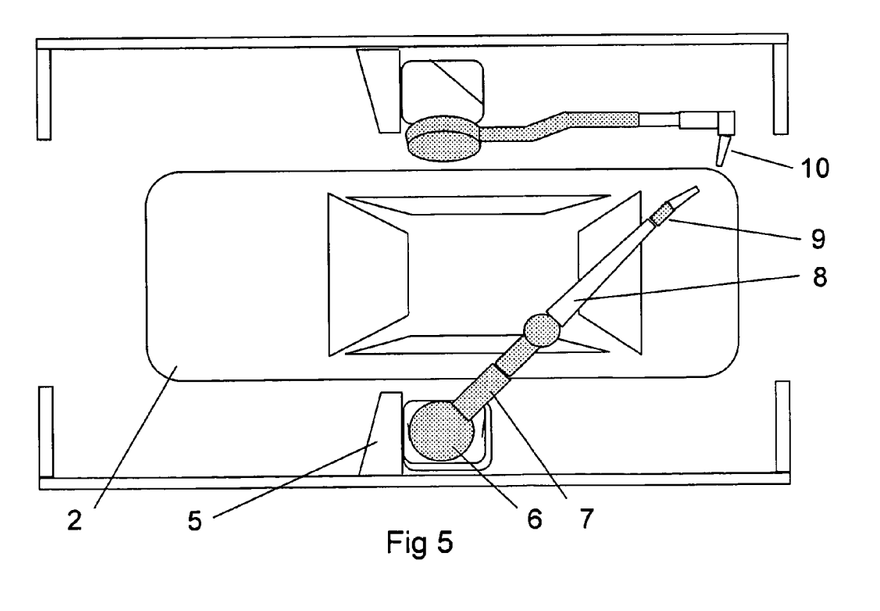
FIG. 5 is a second three dimensional view of a painting system from above according to the invention where the reach of the robots is indicated.

The painting system is presented in another view in FIG. 5 where equal parts have the same numbers as in FIG. 4. While the painting robot in FIG. 4 are held in a home position to give full accessibility to the booth the robots in FIG. 5 are shown in an operation position. From the figure the flexibility of the possible movement of the two painting robots is clearly viewable.

Figure 6:
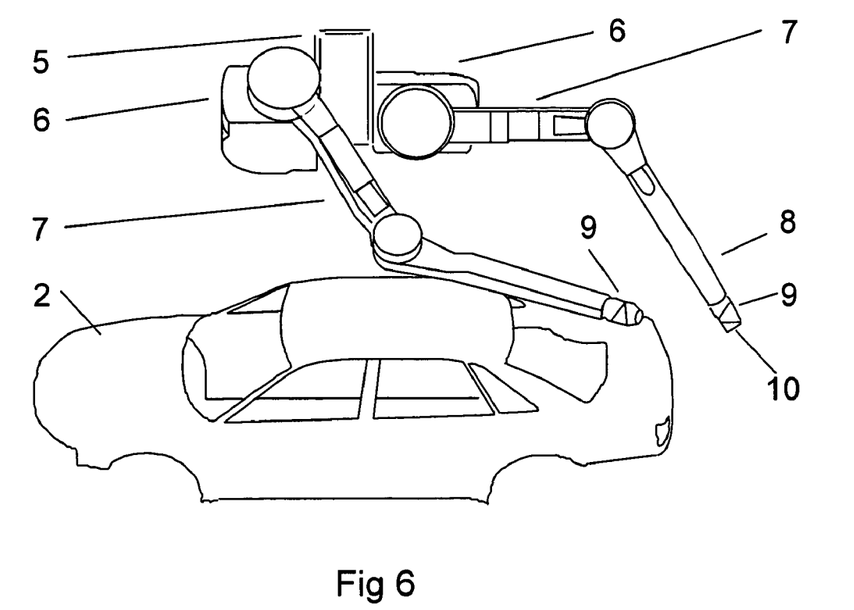
FIG. 6 is a three dimensional view of a further embodiment of a painting system according to the invention with two stationary industrial robots with spray guns mounted on the same wall in a paint booth.
Figure 7:
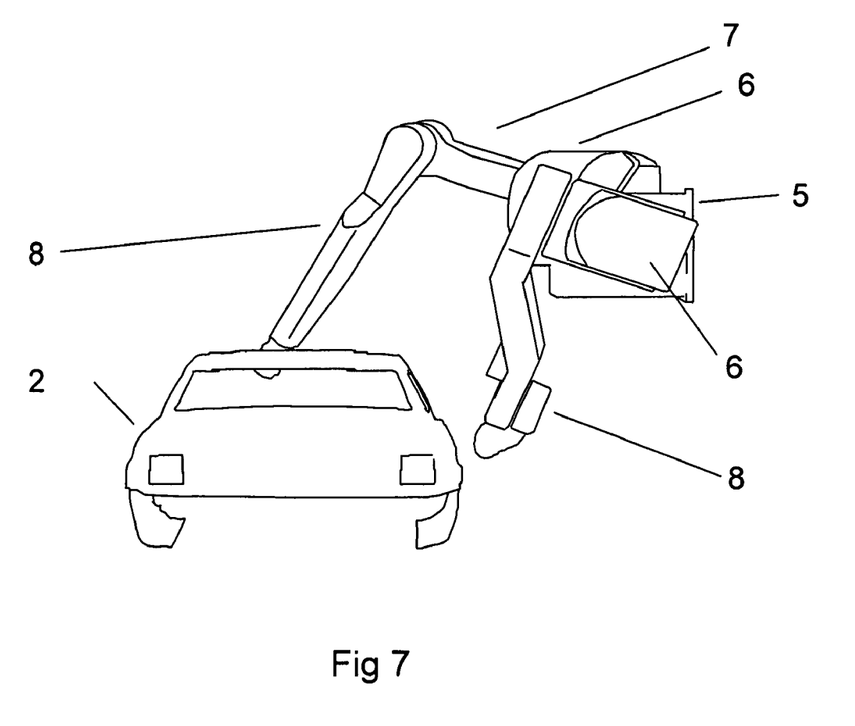
FIG. 7 is a second view of the embodiment in painting system arrangement according to FIG. 6.

A second embodiment of the present invention is shown in FIGS. 6 and 7 where FIG. 6 shows a three dimensional side view of the paint booth and where FIG. 7 shows a three dimensional end view of the paint booth. In this embodiment the two painting robots are mounted on the same base 5 attached to the wall. Again the two robots have the same configuration as in the previous embodiment in FIGS. 4 and 5. Thus each painting robot has a stand 6 carried by the base 5 and rotatably arranged around a first axis. The stand carries a first arm 7 rotatably arranged around a second axis, which in the embodiment shown is oriented normal to the first axis.

The first arm carries a second arm 8 rotatably arranged around a third axis, which in the embodiment shown is oriented parallel to the second axis. The second arm carries an end effector comprising an arm part arrangement 9 with three degrees of freedom moveability. Finally the end effector arrangement carries a painting tool 10 in the form of a spray gun.

The invention must not be restricted to the embodiment shown. Thus within the inventive concept there is to be understood that a third painting robot of the same kind could be installed in the booth in order to increase production capacity or for painting very big objects. It is also within the inventive concept to include a controlling means to control the two robots in their painting operation.

In FIG. 4 the robot arm 7 that rotates around the second axis is depicted as a straight arm. In FIGS. 5 and 6 it is shown that the robot arm 7 that rotates around the second axis may be a bent structure or cranked. It can be seen from FIG. 6 that by arranging each of the second and third axis arms in a cranked form it is possible for the second arm 8 to rotate around the third axis a full 360° relative to the first arm 7.

Figure 8:
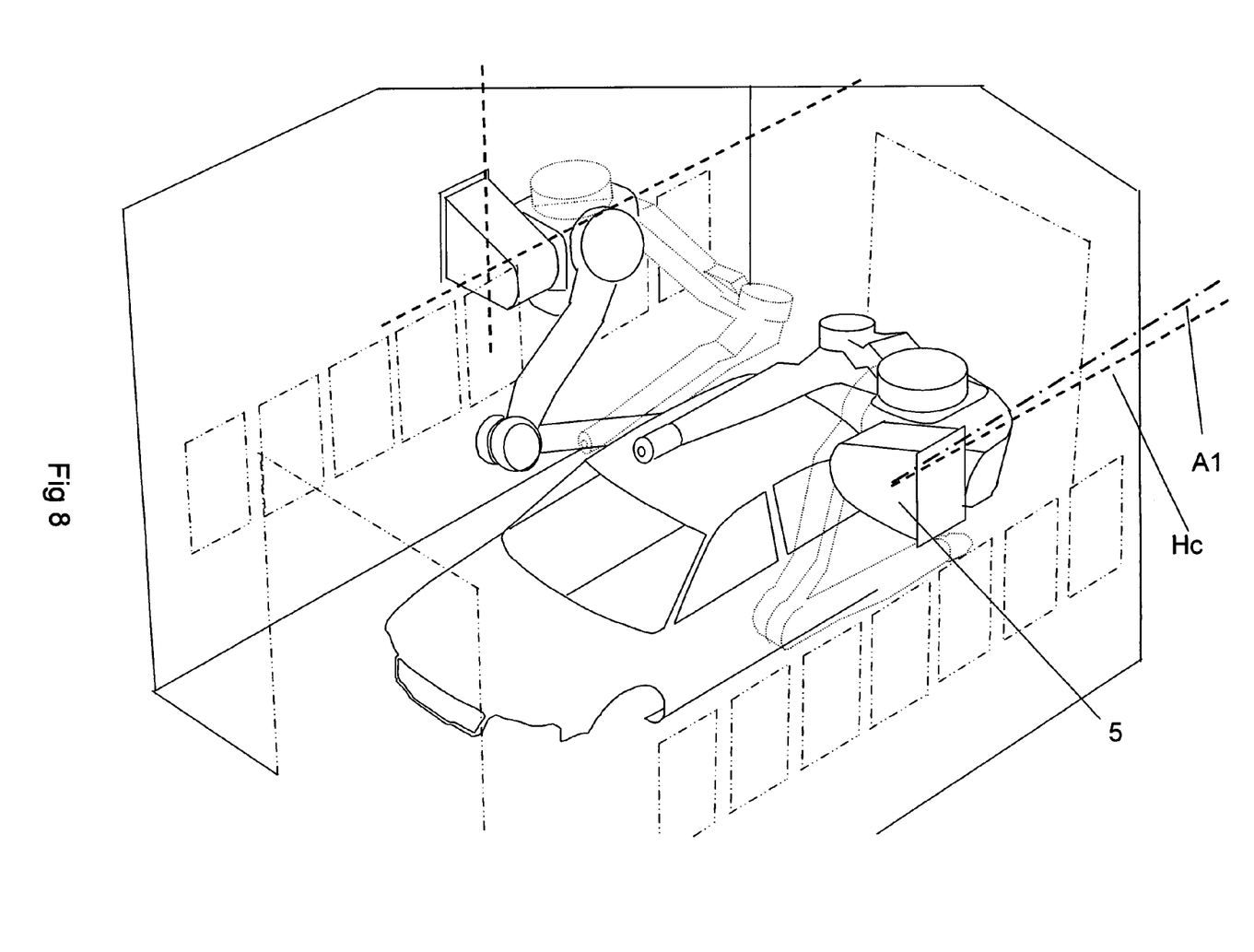
FIG. 8 is a second view of the embodiment in painting system arrangement according to FIG. 6.

FIG. 8 shows a further embodiment in which the base 5 of one or more of the robots may be constructed or so mounted that the first axis in FIG. 4 can be arranged at a different, non perpendicular angle relative to the wall and/or floor to obtain optimal accessibility to both side and top parts of the car bodies. For example the base 5 may be mounted so that the first axis is at a combination of 30 degrees angled relative to horizontal and 10 degrees relative to the vertical, that is relative to the booth wall, as well as other combinations in order to obtain an optimal path movement of the spray gun towards the object/car body.

FIG. 8 shows two robots 3 directly mounted on opposite walls of the booth. Each robot is mounted with axis 1, A1, lying in a horizontal plane, however the base 5 may be mounted such that the first axis is not parallel to the direction of the conveyor Hc and/or not perpendicular to the wall. The arms of the robot on the far wall are shown arranged in each of two relatively extreme positions for spraying low or high along the side of the object, and the arms of the robot on the near wall are shown arranged in each of two positions for spraying high, front of object or low, back of object. It may be seen from FIG. 8 that each robot can cover the object efficiently by means of horizontal strokes directed over a large part of the object when the robot is mounted on the wall in this orientation to the object.

As previously described the base 5 is attached to the wall of the booth. In a preferred embodiment, the robot base is so constructed that the interior of the base may be accessed for maintenance and control purposes from outside of the paint booth. Access through the wall of the paint booth, so as to speak, provides access to, for example, control and diagnostic functions in the base 5 of the robot, as well as, for example, to some mechanical, electrical and electronic components of the robot. Access from outside of the booth via a suitable hatch, cover or window confers tremendous advantages because entry by a technician into the paint booth is no longer required for typical diagnostic and/or maintenance operations. Thus some diagnostic, control and/or maintenance operations may be carried out for robots according to the preferred embodiment while the paint booth is still in operation, operations that are usually impossible or too dangerous to carry out.

It should be noted that while the above describes exemplifying embodiments of the invention, there are several variations and modifications which may be made to the disclosed solution without departing from the scope of the present invention as defined in the appended claims.

The invention claimed is:

1. A painting system for painting large objects, comprising:
   a paint booth with surrounding walls, the surrounding walls comprising a first wall and a plurality of other walls; and
   a painting robot comprising:
      a stationary base,
      a stand carried by the stationary base and rotatable around a first axis,
      a first arm carried by the stand and rotatable around a second axis,
      a second arm carried by the first arm and rotatable around a third axis;
      a painting tool; and
      an end effector carried by the second arm and to which the painting tool is attached, the end effector being operable to orient the painting tool,
      wherein the stationary base of the painting robot is mounted on the first wall in a cantilever manner such that the first axis of the painting robot is spaced inwardly from the first wall and is oriented in one of a horizontal plane and a plane at an acute angle to a horizontal plane.

2. The painting system according to claim 1, wherein the painting robot is a first painting robot and wherein the painting system further comprises a second painting robot mounted on one of the surrounding walls, the second painting robot comprising:
   a stationary base,
   a stand carried by the stationary base and rotatable around a first axis,
   a first arm carried by the stand and rotatable around a second axis,
   a second arm carried by the first arm and rotatable around a third axis;
   a painting tool; and
   an end effector carried by the second arm and to which the painting tool is attached, the end effector being operable to orient the painting tool,
   wherein the stationary base of the second painting robot is mounted on one of the surrounding walls such that the first axis of the second painting robot is oriented in one of a horizontal plane and a plane at an acute angle to a horizontal plane.

3. The painting system according to claim 2, wherein the first axis of each of the first and second painting robots is oriented along the direction of travel of a transport member carrying the objects to be painted.

4. The painting system according to claim 2, wherein the first painting robot and the second painting robot are mounted on opposite walls of the painting booth.

5. The painting system according to claim 2, wherein the first painting robot and the second painting robot are both mounted on the first wall of the painting booth.

6. The painting system according to claim 5, wherein the first painting robot and the second painting robot are mounted on the same stationary base on the first wall of the painting booth.

7. The painting system according to claim 5, wherein the first painting robot and the second painting robot are controlled by the same controlling means.

8. The painting system according to claim 2, wherein the robot system further comprises a third painting robot arranged for painting the top surface of the object to be painted.

9. The painting system according claim 8, wherein the third painting robot is mounted above the first and second painting robots.

10. The painting system according to claim 1, wherein the stationary base of the painting robot is mounted at a level above the object to be painted.

11. The painting system according to claim 1, wherein the second and the third axes are parallel and oriented normal to the first axis.

12. The painting system according to claim 1, wherein the second axis is arranged perpendicular to the first axis and at an angle of less than 90° relative to the floor of the painting booth.

13. The painting system according to claim 1, wherein the second arm is bent.

14. The painting system according to claim 1, wherein the painting robot further comprises a plurality of connected cavities enclosing electric motors, power-and signal cables arranged for the movement of the robot and that a non-ignitable gas of type inert gas, nitrogen, clean air or any other nonflammable gas or a mixture of such gases is maintained under an overpressure throughout the interconnected cavities.

15. The painting system according to claim 1, wherein access to the inside of the stationary base of the painting robot is gained from outside the paint booth, through a wall of the paint booth.

16. The painting system according to claim 1, wherein the painting robot is equipped with multiple applicators.

17. The system according to claim 1, further comprising:
a conveyor operative to transport the objects through the painting booth, wherein the first axis of the painting robot is oriented parallel to a direction of travel of the conveyor.

18. The painting system according to claim 1, wherein the first axis is oriented at an acute angle relative to a vertical plane.

19. The painting system according to claim 1, wherein the end effector has three degrees of freedom of movement.

* * * * *

US007429298C1

(12) EX PARTE REEXAMINATION CERTIFICATE (9879th)

United States Patent
Krogedal et al.

(10) Number: US 7,429,298 C1
(45) Certificate Issued: Oct. 17, 2013

(54) PAINTING SYSTEM (75) Inventors: Arnulf Krogedal, Sandnes (NO); Gisle Bryne, Bryne (NO)

(73) Assignee: ABB AS, Billingstad (NO)

Reexamination Request:
No. 90/020,002, May 9, 2012

Reexamination Certificate for:
Patent No.: 7,429,298
Issued: Sep. 30, 2008
Appl. No.: 10/893,222
Filed: Jul. 19, 2004

Related U.S. Application Data (60) Provisional application No. 60/487,940, filed on Jul. 18, 2003.

(51) Int. Cl.
*B05B 3/00* (2006.01)
*B05B 15/12* (2006.01)
*B05B 7/06* (2006.01)
*B05B 1/28* (2006.01)
*B05B 13/04* (2006.01)
*B05B 13/02* (2006.01)
*B05C 5/00* (2006.01)
*B25J 19/00* (2006.01)
*B05B 12/00* (2006.01)
*B05D 1/02* (2006.01)
*B25J 9/00* (2006.01)
*B25J 11/00* (2006.01)

(52) U.S. Cl.
CPC ............... *B05B 1/28* (2013.01); *B05B 13/0452* (2013.01); *B05B 13/02* (2013.01); *B05C 5/00* (2013.01); *D25J 9/00* (2013.01); *B25J 19/0079* (2013.01); *B05B 13/0431* (2013.01); *B05B 12/00* (2013.01); *B05B 13/04* (2013.01); *B05D 1/02* (2013.01); *B25J 9/0084* (2013.01); *B25J 11/0075* (2013.01); *B05B 15/12* (2013.01); *Y10S 901/43* (2013.01)
USPC ........... 118/323; 118/313; 118/321; 118/326; 901/43

(58) Field of Classification Search
None
See application file for complete search history.

(56) References Cited

To view the complete listing of prior art documents cited during the proceeding for Reexamination Control Number 90/020,002, please refer to the USPTO's public Patent Application Information Retrieval (PAIR) system under the Display References tab.

*Primary Examiner* — Terrence Till (57) ABSTRACT

Painting system for painting large objects comprising a paint booth with surrounding walls and a robot installation comprising a plurality of painting robots, each painting robot comprising a stationary base, a stand carried by the base rotatably arranged around a first axis, a first arm carried by the stand rotatably arranged around a second axis, a second arm carried by the first aim rotatably arranged around a third axis and a forth, a fifth and a sixth arm part carried by the second arm for orienting an attached painting tool.

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is determined to be patentable as amended.

Claims 2-19, dependent on an amended claim, are determined to be patentable.

New claims 20 and 21 are added and determined to be patentable.

1. A painting system for painting large objects, comprising:
   a paint booth with surrounding walls, the surrounding walls comprising a first wall and a plurality of other walls; and
   a painting robot comprising:
      a stationary base,
      a stand carried by the stationary base and rotatable around a first axis,
      a first arm carried by the stand and rotatable around *and extending away from* a second axis,
      a second arm carried by the first arm and rotatable around a third axis;
      a painting tool; and
      an end effector carried by the second arm and to which the painting tool is attached, the end effector being operable to orient the painting tool,
      wherein the stationary base of the painting robot is mounted on the first wall in a cantilever manner such that the first axis of the painting robot is spaced inwardly from the first wall and is oriented in one of a horizontal plane and a plane at an acute angle to a horizontal plane.

*20. A painting system for painting large objects, comprising:*
   *a paint booth with surrounding walls, the surrounding walls comprising a first wall and a plurality of other walls; and*
   *a painting robot comprising:*
      *a stationary base,*
      *a stand carried by the stationary base and rotatable around a first axis,*
      *a first arm carried by the stand and rotatable around a second axis,*
      *a second arm carried by the first arm and rotatable around a third axis, wherein the second and the third axes are parallel and oriented normal to the first axis;*
      *a painting tool; and*
      *an end effector carried by the second arm and to which the painting tool is attached, the end effector being operable to orient the painting tool, wherein the stationary base of the painting robot is mounted on the first wall in a cantilever manner such that the first axis of the painting robot is spaced inwardly from the first wall and is oriented in one of a horizontal plane and a plane at an acute angle to a horizontal plane.*

*21. A painting system for painting large objects, comprising:*
   *a paint booth with surrounding walls, the surrounding walls comprising a first wall and a plurality of other walls; and*
   *a painting robot comprising:*
      *a stationary base,*
      *a stand carried by the stationary base and rotatable around a first axis,*
      *a first arm carried by the stand and rotatable around a second axis,*
      *a second arm carried by the first arm and rotatable around a third axis;*
      *a painting tool; and*
      *an end effector carried by the second arm and to which the painting tool is attached, the end effector being operable to orient the painting tool,*
      *wherein the stationary base of the painting robot is mounted on the first wall in a cantilever manner such that the first axis of the painting robot is spaced inwardly from the first wall and is oriented in one of a horizontal plane and a plane at an acute angle to a horizontal plane, the painting robot operable to paint an exterior surface of the large object in horizontal strokes.*

\* \* \* \* \*